(12) United States Patent
Serrano et al.

(10) Patent No.: US 11,821,379 B1
(45) Date of Patent: Nov. 21, 2023

(54) NON-ROTATING CYLINDER PATTERN SELECTION FOR EQUALIZING CYLINDER USAGE IN AN INTERNAL COMBUSTION ENGINE

(71) Applicant: Tula Technology, Inc., San Jose, CA (US)

(72) Inventors: Louis J. Serrano, Los Gatos, CA (US); Xin Yuan, Palo Alto, CA (US); Shikui Kevin Chen, Leander, TX (US); Xi Luo, San Jose, CA (US); Robert C. Wang, San Jose, CA (US); Xiaoping Cai, Fremont, CA (US); Vijay Srinivasan, Farmington Hills, MI (US)

(73) Assignee: Tula Technology, Inc., San Jose, CA (US)

( * ) Notice: Subject to any disclaimer, the term of this patent is extended or adjusted under 35 U.S.C. 154(b) by 0 days.

(21) Appl. No.: 17/830,925

(22) Filed: Jun. 2, 2022

(51) Int. Cl.
*F02D 41/00* (2006.01)
*F02D 41/24* (2006.01)

(52) U.S. Cl.
CPC ..... *F02D 41/0087* (2013.01); *F02D 41/0085* (2013.01); *F02D 41/2403* (2013.01); *F02D 2041/0012* (2013.01); *F02D 2200/0802* (2013.01); *F02D 2200/1002* (2013.01); *F02D 2200/50* (2013.01)

(58) Field of Classification Search
CPC ............. F02D 41/0087; F02D 41/2403; F02D 2041/0012
USPC ................................ 123/198 F, 481
See application file for complete search history.

(56) References Cited

U.S. PATENT DOCUMENTS

| | | | |
|---|---|---|---|
| 5,778,858 A * | 7/1998 | Garabedian | F02D 41/1443 123/481 |
| 7,143,727 B1* | 12/2006 | Winstead | F01N 3/0842 123/481 |
| 7,577,511 B1 | 8/2009 | Tripathi et al. | |
| 8,099,224 B2 | 1/2012 | Tripathi et al. | |
| 9,086,020 B2 | 7/2015 | Tripathi et al. | |
| 9,399,964 B2* | 7/2016 | Younkins | F01L 1/047 |
| 2011/0213540 A1* | 9/2011 | Tripathi | F02D 17/02 701/102 |
| 2018/0112609 A1* | 4/2018 | Serrano | F02D 41/3058 |
| 2018/0313281 A1* | 11/2018 | Nakano | F02D 41/345 |
| 2019/0346012 A1* | 11/2019 | Gerty | F02B 67/08 |
| 2020/0018197 A1* | 1/2020 | McCarthy, Jr. | F02D 41/0087 |
| 2022/0065182 A1* | 3/2022 | Serrano | F02D 41/0055 |
| 2022/0205401 A1* | 6/2022 | Kolhouse | F02D 41/08 |

FOREIGN PATENT DOCUMENTS

| WO | WO 2010/006311 | 1/2010 |
|---|---|---|
| WO | WO 2011/085383 | 7/2011 |

* cited by examiner

*Primary Examiner* — Erick R Solis
(74) *Attorney, Agent, or Firm* — Beyer Law Group LLP

(57) ABSTRACT

A system and method for operating an ICE by (a) generating a running history of one or more-cylinder events per cylinder, and (b) using the running history to select a least-used non-rotating firing pattern, among a plurality of non-rotating firing patterns, provided for each firing fraction less than one (1). By making the least used selection based on the running history, unequal usage among cylinders of the ICE can be mitigated.

42 Claims, 9 Drawing Sheets

ICE FIRING SEQUENCE

| 1 | 5 | 3 | 6 | 2 | 4 |

FIG. 3A

X = Fire
O = Skip

FF = 1/3

| Pattern | Cylinder | 1 | 2 | 3 | 4 | 5 | 6 |
|---|---|---|---|---|---|---|---|
| A | | O | X | X | X | X | O |
| B | | X | O | X | X | O | X |
| C | | X | X | O | O | X | X |

| Pattern | Cylinder | 1 | 2 | 3 | 4 | 5 | 6 |
|---|---|---|---|---|---|---|---|
| D | | O | O | O | X | X | X |
| E | | X | X | X | O | O | O |

| Pattern | Cylinder | 1 | 2 | 3 | 4 | 5 | 6 |
|---|---|---|---|---|---|---|---|
| F | | X | O | O | O | O | X |
| G | | O | X | O | O | X | O |
| H | | O | O | X | X | O | O |

FIG. 3D

NON-ROTATING CYLINDER PATTERN SELECTION FOR EQUALIZING CYLINDER USAGE IN AN INTERNAL COMBUSTION ENGINE

FIELD OF THE INVENTION

The present invention relates to a variable displacement internal combustion engine (ICE) capable of operating at one or more firing fractions that are less than one (1) by selectively deactivating cylinders (CDA), and more specifically, to a system and method for operating an ICE by (a) generating a running history of one or more-cylinder events per cylinder, and (b) using the running history to select a least-used non-rotating firing pattern, among a plurality of non-rotating firing patterns, provided for each firing fraction less than one (1). By making the least used selection based on the running history, unequal usage among cylinders of the ICE can be mitigated.

BACKGROUND

Most vehicles in operation today are powered by internal combustion engines (ICEs). Under normal driving conditions, the torque generated by an ICE needs to vary over a wide range to meet the demands of the driver. In situations when full torque is not needed, the fuel efficiency can be substantially improved by varying the displacement of the engine. With variable displacement, the engine can generate full displacement when needed, but otherwise operates at a smaller effective displacement when full torque is not required, resulting in improved fuel efficiency.

Currently commercially available variable displacement ICEs typically use non-rotating firing patterns, meaning for a given firing fraction that is less than one (1), the same group of cylinders are continually activated, while the remaining group of cylinders are continually deactivated. With a six-cylinder ICE, different reduced displacements may be achieved by activating any group of one through five cylinders. However, effective reduced displacements are typically limited to a subset of all the possible groups. A six-cylinder engine may be limited to groups of two, three, or four cylinders respectively. For example:

(a) With the ⅓ firing fraction, the same two cylinders are always continually activated, while the remaining four cylinders are always continually deactivated;
(b) With the ½ firing fraction, the same three cylinders are always continually activated, while the remaining three cylinders are always continually deactivated; and
(c) With the ⅔ firing fraction, the same four cylinders are always continually activated, while the remaining two cylinders are always continually deactivated.

During normal driving, the firing fraction used by the ICE will typically transition between the different variable displacements as needed as torque demands change. By using the same non-rotating firing patterns for each firing fraction less than one (1), some cylinders tend to be activated and fired more often than others. As a result, there is typically uneven usage of cylinders. For instance, if cylinders 1, 2, and 3 are always active when a firing fraction of ½ is used, then those cylinders will tend to be used much more often than cylinders 4, 5 and 6

With any ICE, valvetrains, the internal walls of cylinders, fuel injectors, piston seals, etc., are subject to wear and tear with prolonged use. With variable displacement ICE's, the wear and tear of these components, however, is non-uniform. The internal walls of the cylinders and piston seals wear quicker for cylinders that are fired more often, whereas the valve deactivation mechanisms tend to wear quicker for cylinders that are skipped more often. Consequently, ICEs with uneven usage of cylinders and/or valves tend to have higher repair and/or failure rates.

For variable displacement ICE's that have uneven usage of cylinder firings, an engine controller and method for substantially equalizing the rate of cylinder firings and/or valve activations among all the cylinders is needed.

SUMMARY OF THE INVENTION

In one non-exclusive embodiment, the present invention is directed to a system and method for operating an ICE by (a) generating a running history of one or more-cylinder events per cylinder, and (b) using the running history to select a least-used non-rotating firing pattern, among a plurality of non-rotating firing patterns, provided for each firing fraction less than one (1). By making the least used selection based on the running history, unequal usage among cylinders of the ICE can be mitigated.

In another non-exclusive embodiment, the present invention is directed to a system and method for operating a variable displacement ICE where (a) multiple different non-rotating firing patterns are defined for each reduced effective displacement less than one, and (b) the usage of the multiple different non-rotating firing patterns for each reduced effective displacement are alternated to even out usage among the cylinders of the ICE over time.

BRIEF DESCRIPTION OF THE DRAWINGS

The invention and the advantages thereof, may best be understood by reference to the following description taken in conjunction with the accompanying drawings in which:

FIG. 3A through FIG. 3D illustrates a cylinder firing sequence and different non-rotating firing patterns for different firing fractions in accordance with a non-exclusive embodiment of the invention.

In the drawings, like reference numerals are sometimes used to designate like structural elements. It should also be appreciated that the depictions in the figures are diagrammatic and not to scale.

DETAILED DESCRIPTION

Figure 1:
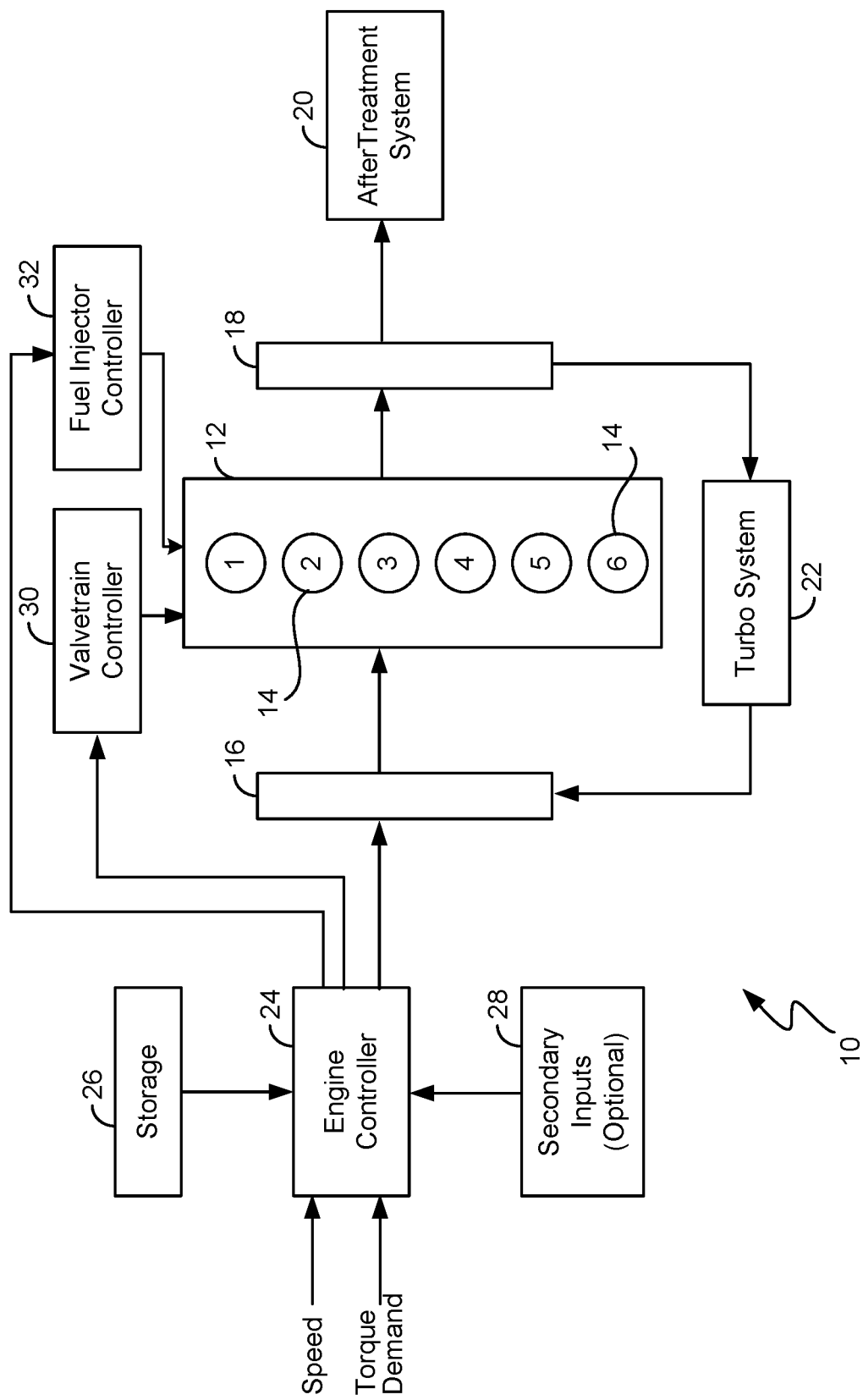
FIG. 1 is a block diagram of an exemplary variable displacement six-cylinder ICE and an engine controller in accordance with a non-exclusive embodiment of the present invention.

Referring to FIG. 1, a diagram of an ICE control system 10 is illustrated. The system 10 includes an ICE 12 with a plurality of cylinders 14, an air intake manifold 16, and exhaust manifold 18, an aftertreatment system 20 fluidly coupled to the ICE 12 through the exhaust manifold 18, a turbo system 22, an engine controller 24, a storage device 26, one or more optional secondary inputs 28 provided to the engine controller 24, a valve train controller 30 and a direct and/or port fuel injector controller 32, both of which are controlled by the controller 24. In various embodiments, the memory device 26 may be volatile or non-volatile memory.

Number of Cylinders

The ICE 12 in the embodiment illustrated, includes six-cylinders 14, numbered one (1) through six (6). It should be understood, however, that in alternative embodiments the number of cylinders 14 may widely vary. For instance, the ICE 12 may include 2, 3, 4, 5, 6, 8 10, 12 or 16 cylinders. The number of cylinders listed herein is merely exemplary and the ICE 12 may include any number of cylinders, including others than explicitly listed herein.

Variable Displacement

As explained in more detail below, the ICE 12 can be selectively operated in either full displacement mode where all six-cylinders are activated and fired, or in one of several reduced displacement modes, where some fraction less than one (1) of the cylinders are activated and fired, while the remainder of the cylinders are deactivated and not fired.

With the six-cylinder ICE 12 for instance, the reduced displacement modes may include fractions of:
1. $\frac{1}{3}^{rd}$ where two (2) of the six (6) cylinders 14 are activated and fired, while the remaining four (4) cylinders 14 are skipped;
2. ½ where three (3) of the cylinders 14 are activated and fired, while the other three cylinders 14 are skipped; and
3. ⅔rds where four (4) of the six (6) cylinders 14 are activated and fired, while the remaining two (2) cylinders 14 are skipped.

It is noted that the reduced displacement modes recited herein are merely exemplary and should in no manner be construed as limiting. On the contrary, fewer or more reduced displacement fractions may be used. For instance, the above-described six-cylinder ICE may also operate at other reduced effective displacements such as $\frac{1}{6}^{th}$ or $\frac{5}{6}^{th}$. In addition, with ICEs having either more or fewer cylinders, a wide variety of different reduced displacement fractions less than one (1) may be implemented as well. Accordingly, the ICE 12 and the specific reduced displacement fractions as described herein are merely exemplary and should not be construed as limiting in any regard.

Fuel Types

In various non-exclusive embodiments, the ICE 12 may be able to combust one or more different types of fuels, such as gasoline, ethanol, diesel, compressed natural gas, methanol, or any combination thereof.

Spark and Compression Ignition

In yet other non-exclusive embodiments, the ICE 12 may rely on spark-ignition or compression-ignition. Spark ignition engines, which typically operate on gasoline, require a spark to initiate combustion. Spark ignition engines are generally operated with a stoichiometric air-fuel ratio and the mass air charge (MAC) provided to a cylinder controls its torque output. The mass air charge is generally controlled using a throttle to adjust the intake manifold absolute pressure (MAP). With compression ignition engines, which typically operate with Diesel fuel, combustion is initiated by a temperature increase associated with compressing a charge within the cylinder chamber. Compression ignition engines primarily control cylinder torque output by adjusting the amount of fuel injected (hence changing the air-fuel stoichiometry) and/or throttling or boosting the air charge to obtain an appropriate or desired air fuel ratio. The air fuel ratio (AFR) for compression engines is typically larger than stoichiometric. For example, a Diesel engine may typically operate with air-fuel ratios of approximately 20 to 160 compared to a stoichiometric air-fuel ratio of approximately 14.5. Compression ignition engines may be further classified as stratified charge compression ignition engines (e.g., most conventional Diesel engines, and abbreviated as SCCI), premixed charge compression ignition (PCCI), reactivity-controlled compression ignition (RCCI), gasoline compression ignition engines (GCI or GCIE), and gasoline homogeneous charge compression ignition (HCCI).

Turbo Boosting

In optional embodiments, the ICE 12 is "boosted" with the turbo system 22. As is well known in the art, the turbo system 22 is powered by a turbine (not shown) driven by exhaust gases from the ICE 12 via the exhaust manifold 18. With the turbo system 22, more air, and therefore proportionally more fuel, may be inducted into the individual cylinders 14 of the ICE 12. As a result, the ICE 12 can generate more torque output compared to a naturally aspirated version of the same ICE.

Working Cycles

The cylinders 14 of the ICE 12 include a combustion chamber, a reciprocating piston that defines one side of the combustion chamber, at least one intake valve and at least one exhaust valve. Most modern ICEs now include two intake and two exhaust valves. The valvetrain controller 30 of the ICE 12 is responsible for controlling the timing of the opening and closing of the valves during the working cycles of the cylinders. Valvetrains can be cam-actuated, electronic, hydraulic, pneumatic, or combinations of these types.

With a four-stroke ICE, each cylinder executes a four-stroke sequence every working cycle. The four strokes include induction, compression, combustion (sometimes referred to as expansion) and exhaust.

In the induction stroke, the piston moves from Top Dead Center (TDC) to Bottom Dead Center (BDC) within the internal walls of the cylinder 14 as the intake valve(s) is/are moved to an open position by the valvetrain. As a result, air is sucked or inducted into the combustion chamber from the intake air manifold 16 through the open intake valve(s). Particularly for a spark ignition engine, the fuel injector controller 32 may coordinate the injection of fuel into the cylinder 14 as well during the induction stroke. Together, the air and fuel mixture create an air-fuel charge in the chamber.

In the compression stroke, the intake valve(s) is/are closed and the piston moves from BDC to TDC, compressing the air-fuel charge within the chamber. With spark-ignition engines, a spark is used to ignite the air-fuel charge. The timing of the spark is typically before the piston reaches the TDC position as the compression stroke completes. With compression-ignition engines, the fuel is typically injected in the compression stroke, but no spark is used for ignition. Instead, a combination of high pressure and high temperature created within the combustion chamber of the cylinder 14 as the piston moves toward and approaches TDC initiates combustion. With either type of engine, combustion is usually initiated before the piston reaches the TDC position, completing the compression stroke. However, with certain Diesel engines, combustion may not always be initiated before completing the compression stroke. In many cases, it is desirable to initiate combustion after TDC for the purpose of reducing NOx emissions.

In the expansion stroke combustion may be completed. The energy released by combustion causes the piston to move from TDC to BDC, resulting in the generation of useful work (i.e., a torque output) by the cylinder.

Finally, in the exhaust stroke, the exhaust valve(s) is/are opened by the valvetrain controller 30 as the piston moves from BDC to TDC, forcing or exhausting the combusted gases through the exhaust manifold 18 and into the aftertreatment system 20. The working cycle is complete when the exhaust valve(s) is/are closed and the piston is again positioned at the TDC. The above process is then repeated for the next working cycles of the cylinder.

Engine Cycles

During a given engine cycle of the ICE 12, the working cycles of the cylinders 14 are sequenced in order. When the ICE 12 is operating at full displacement (i.e., a firing fraction of 1), all the cylinders are fired in their sequence order. On the other hand, when operating at a firing fraction less than 1, one or more of the cylinders is not fired (i.e., skipped) during a given engine cycle. The cylinders of skipped working cycles have the same reciprocating motion of the piston as a firing cylinder, but no fuel is combusted. Also, in certain non-exclusive embodiments as described below, the cylinders of skipped working cycles may be operated as one of several different types of pneumatic springs.

Pneumatic Spring Types

The pneumatic spring types include an Air Spring (AS), Low-Pressure Exhaust Springs (LPES), and High-Pressure Exhaust Springs (HPES). With each spring type, the valvetrain controller 30, in response to the engine controller 24, is responsible for timing of the opening and/or closing of intake and/or exhaust valves as needed.

Air Springs (AS)

With AS type pneumatic springs, in the intake stroke, the intake valve(s) of the cylinder is opened, and air is inducted as it would be on a fired working cycle. In the compression stroke, the inducted air is then compressed. In the expansion stroke there is no fuel, so there is no combustion. In the exhaust stroke, the exhaust valve(s) is/are maintained closed so that the air is not exhausted. One disadvantage of AS pneumatic springs is that a portion of the fresh charge can escape past the piston rings into the crankcase, which creates inefficiencies and yields a lower peak in-cylinder pressure. As a result, upon the re-firing of the cylinder, late and/or unstable combustion, or potentially a misfire, may occur after multiple consecutive skip events without re-exhaust/re-intake prior to re-firing. One possible solution to avoid the above-listed issues is to exhaust the air spring by reactivating through the engine valves at the appropriate time and inducting a new intake charge of known composition and characteristics. However, for rotating patterns, re-exhaust and re-intake is preferably avoided to prevent pumping losses and to prevent unwanted cooling of the exhaust flow, which is particularly problematic for diesel engines. For fixed patterns, re-exhaust/re-intake prior to re-firing is generally more tolerable mainly due to the relative infrequent occurrence of such events.

A variant of AS, referred to as AS with re-intake, fuel injection is disabled when the decision to skip is made. Intake would still occur normally, but no combustion would occur in the absence of fuel, even with spark ignition engines. The exhaust valve(s) would then be deactivated, and finally, the intake valves also would be deactivated, and the engine would run as an AS spring until the decision to reactivate is made. For reactivation, the first step would generally be to reactivate the intake valve(s) with fuel injection. This would refill the cylinder with fresh charge. Combustion then occurs as normal, regardless of if spark ignited or by compression ignition, depending on the type of combustion engine. Finally, the exhaust valve would be reactivated. This strategy has the benefit of avoiding the lower combustion air charge associated with normal AS. One downside is that the pumping can be significant if the number of skipped cycles is relatively low. Another drawback is the intake valve may possibly open against the compressed air in the chamber of the cylinder, which may produce "popping" noise.

In yet another variation, referred to as AS with re-exhaust, differs from the other AS variations in that when the decision is made to stop skipping and start firing again, the exhaust valve is reactivated first, followed by intake and fuel injection. Like AS with re-intake, this avoids the lower air charge and a resulting weak combustion event that would likely occur on the first reactivated cycle. By re-exhausting, potential hardware damage is avoided by preventing the re-intake into a chamber that is at high pressure.

Low Pressure Exhaust Springs (LPES)

A LPES is realized by deactivating the intake valve(s) of a cylinder during the induction stroke of a working cycle immediately following the opening of the exhaust valve(s) of the previous working cycle in which combustion occurred, exhausting the previous charge. By deactivating the intake valve(s), no air is inducted into the chamber. As a result, during the subsequent compression stroke as the piston moves from BDC to TDC, the pressure inside the chamber is relatively low because only residual combusted gas from the previous fired working cycle remains in the chamber. No fuel is injected into the chamber as well, so no combustion occurs (regardless of if a spark occurs or not). In the exhaust stroke, the exhaust valve(s) is/are deactivated. The residual combusted gas, therefore, remains within the chamber and is not exhausted. Since no air is inducted into the cylinder, LPES offers the advantages of low pumping losses and little to no heat lost through heat transfer to the walls of the cylinder. The main disadvantage with LPES is a very small, precise valve deactivation timing window. As a result, employing a LPES require a very fast responding valvetrain. Another potential disadvantage of a LPES is that in-cylinder pressures may be below atmospheric, which may cause oil ingress into the combustion chamber through the piston rings.

A variant on the LPES is LPES with re-exhaust. In this case, the exhaust valve is reactivated before the intake valve, which results in two exhaust strokes without an intervening induction stroke. In this reactivation strategy the exhaust valve is reactivated first, followed by the intake valve, and then fuel and spark. There are several reasons for doing this. First by having a re-exhaust event, gases that have leaked into the cylinder are expelled prior to induction, making the inducted charge more similar to that of a cylinder operating without deactivation. A normally firing engine relies on valve overlap and gas flow momentum to scavenge as much exhaust residual from the cylinder as possible. This is missing from LPES without re-exhaust and will lead to lower volumetric efficiency on the first reactivated cycle. Second, if combustion has occurred, perhaps mistakenly, during a skipped cycle, the re-exhaust would prevent the intake valve from opening with potentially high pressure within the combustion chamber, which would likely cause significant valve train damage. Re-exhaust could be incorporated into a safety feature that requires the exhaust valve of any cylinder to open before the intake valve is allowed to open. If the exhaust valve fails to open or is deactivated, the intake valve would automatically be deactivated. A downside of this method is that its pumping loop is larger, and thus energy efficiency is lower, than that of normal LPES if the number of skipped cycles is short. As the number of skipped cycles increases the performance of the two methods becomes essentially equivalent, since most strokes experience identical conditions.

High Pressure Exhaust Springs (HPES)

With a HPES spring, the induction, compression, and expansion strokes occur as normal for a fired cylinder. In the exhaust stroke, however, the exhaust valve(s) is/are not opened. As a result, combusted exhaust gas remains trapped within the chamber. In the next working cycle, the intake valve(s) of the cylinder is/are deactivated so that no new air is inducted. Instead, the trapped exhaust gas is expanded in the intake stroke and then compressed in the compression stroke. Since there is no fresh air in the cylinder, and no fuel is typically injected, there is no combustion in the combustion stroke. Instead, the trapped exhaust gas is again expanded and compressed in the exhaust stroke by maintaining the exhaust valve(s) closed. A disadvantage of a HPES is that the trapped high pressure combusted exhaust gas can leak down quickly, resulting in higher fuel consumption compared to a LPES, due to a combination of higher heat transfer losses through the cylinder walls and a higher residual leakage of the charge via the crankcase and/or valves.

HPES with re-intake is a variation of the above-described HPES. In this strategy, when a skipping cylinder is reactivated, the intake valve is reactivated first, followed by fuel and exhaust. This is like the reactivation process of LPES without re-exhaust. As mentioned above, this strategy has the potential to cause valve train damage due to opening the intake valve on an in-cylinder pressure at a level near combustion peak pressure. This can be prevented with appropriate design of the intake valve and its associated valve train. By opening the intake valve on a HPES, the high-pressure exhaust residual in the cylinder will blow down into the intake manifold, causing significant heating of the incoming charge and noise. Volumetric efficiency may be low on the first reactivated cycle. The intake valves, ports, and manifold would need to be designed to handle higher than usual levels of pressure and temperature. This method has very large expansion/compression losses during deactivation resulting in large negative spring mean effective pressure, and consequently low fuel efficiency if the number of skipped cycles is short. This mode of operation may be especially useful in engines where some working cycles use homogenous charge compression ignition (HCCI) or similar types of combustion strategies.

Controller Operation

During operation, the controller 24 is arranged to receive torque requests and other inputs, such as the engine speed (RPMs) of the ICE 12. In response, the controller 24 selects a firing fraction that is suitable to meet the current or instantaneous torque request.

In situations when the torque request is sufficiently high, the controller 24 operates the ICE 12 at full displacement. With a firing fraction of one (1), the controller 24 commands the valvetrain controller 30, and the fuel injection controller 32 to fuel, activate, and fire all six (6) of the cylinders 14 of the ICE 12.

On the other hand, with lower torque requests, controller 24 preferably operates the ICE 12 at one of several reduced displacements to improve fuel efficiency. As noted above, the reduced displacements for the six (6) cylinder ICE 12 in this non-exclusive embodiment include fractions of $\frac{1}{3}^{rd}$, $\frac{1}{2}$, and $\frac{2}{3}$rds. With each of these reduced displacements, the controller 24 commands the valvetrain controller 30 and fuel injection controller 32 to fuel and fire in non-rotating patterns only groups two (2), three (3), or four (4) cylinders 14, while not fueling and skipping the remaining cylinders respectively. As the torque request, and possibly other inputs change, the controller 24 transitions between the various firing fractions of $\frac{1}{3}$rd, $\frac{1}{2}$, $\frac{2}{3}$rds, and 1 as needed to meet the changing operating conditions.

For the sake of simplicity, the operation of the ICE 12 includes the reduced displacements of $\frac{1}{3}$rd, $\frac{1}{2}$, and $\frac{2}{3}$rds. It should be understood, however, that a six-cylinder ICE may also implement other reduced displacements including $\frac{1}{6}^{th}$ and/or $\frac{5}{6}^{th}$ as needed to meet the changing operating conditions. With these two fractions, either one cylinder 14 is continually fired while the remaining 5 are continually skipped, or five cylinders are continually fired, while one cylinder is continually skipped.

Cylinder Fires and Skips and Valve Activations

A cylinder firing is commonly understood to mean that a cylinder in a working cycle is fueled and fired, resulting in a torque output.

A skip on the other hand is commonly understood to mean that no combustion occurs during a given working cycle. With skips, no fuel is injected, while the intake and exhaust valves of the cylinder are typically maintained closed during the working cycle to prevent pumping losses, and/or to prevent the aftertreatment system 20 from cooling.

It may be advantageous to open the intake and/or exhaust valves during a skip for re-intake, re-exhaust, re-charging and/or reactivation events as described above. A valve actuation, as used herein, is therefore intended to cover any event in which either the intake or exhaust valves of cylinder are opened for any reason, including, but not limited to, those listed above.

Cylinder Recharging and Reactivation Strategies

When a skipped cylinder is operated as either an AS or HPES over one or more successive working cycles when the ICE is operating in a reduced displacement mode, the pressure and temperature within the chamber will often drop, and in some situations, below atmospheric pressure. As a result of the pressure and/or temperature drop, engine oil may be sucked into the combustion chamber from the crankcase through the piston rings and/or through the valve assembly. Oil consumption is a source of harmful emissions and may also damage the aftertreatment system 20.

For AS and HPES pneumatic springs, cylinder re-charging involves timing the opening and closing of the intake and exhaust valves to avoid or minimize sub-atmospheric in-cylinder pressures, and hence reduce oil consumption. Cylinder re-charging may be implemented in a number of different ways, including the controller 24 commanding the valvetrain controller 30 to (i) open and close the intake and exhaust valves during the same working cycle (i.e., intake and exhaust in the same working cycle), (ii) open the exhaust valve in one working cycle and then open the intake valve in the next working cycle (i.e., exhaust without re-intake) or (iii) open the intake valve without opening the exhaust valve (re-intake without re-exhaust).

During cylinder re-charging, the intake and exhaust valves do not necessarily have to be fully opened and closed as per a typical fired working cycle. Instead, the controller 24 can command the valvetrain controller 30 to "blip" the intake and exhaust valves of a cylinder 14 open and closed, meaning the valve(s) is/are opened for just enough time to substantially equalize the in-cylinder pressure with the intake manifold pressure and the exhaust valve(s) are opened for just enough time to equalize the in-cylinder pressure with the exhaust manifold pressure.

Also applicable to AS and HPES pneumatic springs, reactivation is the prepping of a cylinder after a skipped working cycle so that the cylinder is prepared for a fire in the subsequent working cycle. Reactivation typically involves the controller 24 commanding the valvetrain controller 30 to exhaust the cylinder in the immediately previously skipped cycle before the next working cycle in which the cylinder is to be fired. If the cylinder is not properly exhausted, the chamber may be damaged during induction of the intake stroke of the subsequent working cycle in which the cylinder is to be fired.

Reducing Cylinder Wear and Tear

As noted above, conventional variable displacement engines may rely on a single non-rotating firing pattern for each firing fraction less than one (1). As a result, certain cylinders of the ICE tend to be fired more often than others over prolong operation, resulting in uneven wear and tear, and potentially early failure, among the cylinders that are activated more often.

The present invention solves the above-defined issue by:
1. Maintaining a running history of one or more-cylinder events that are tracked per cylinder and maintained in storage 26,
2. Defining a plurality of different non-rotating patterns for each firing fraction less than one (1); and
3. Selecting the non-rotating pattern that is least used, as determined from the running history of one or more-cylinder events, each opportunity the ICE 12 is operated at one of the firing fractions less than one (1).

By selecting the least-used non-rotating rotating patterns when operating the ICE 12 in the reduced displacement mode, unequal usage among cylinders of the ICE is mitigated.

Cylinder Event History

Figure 2:
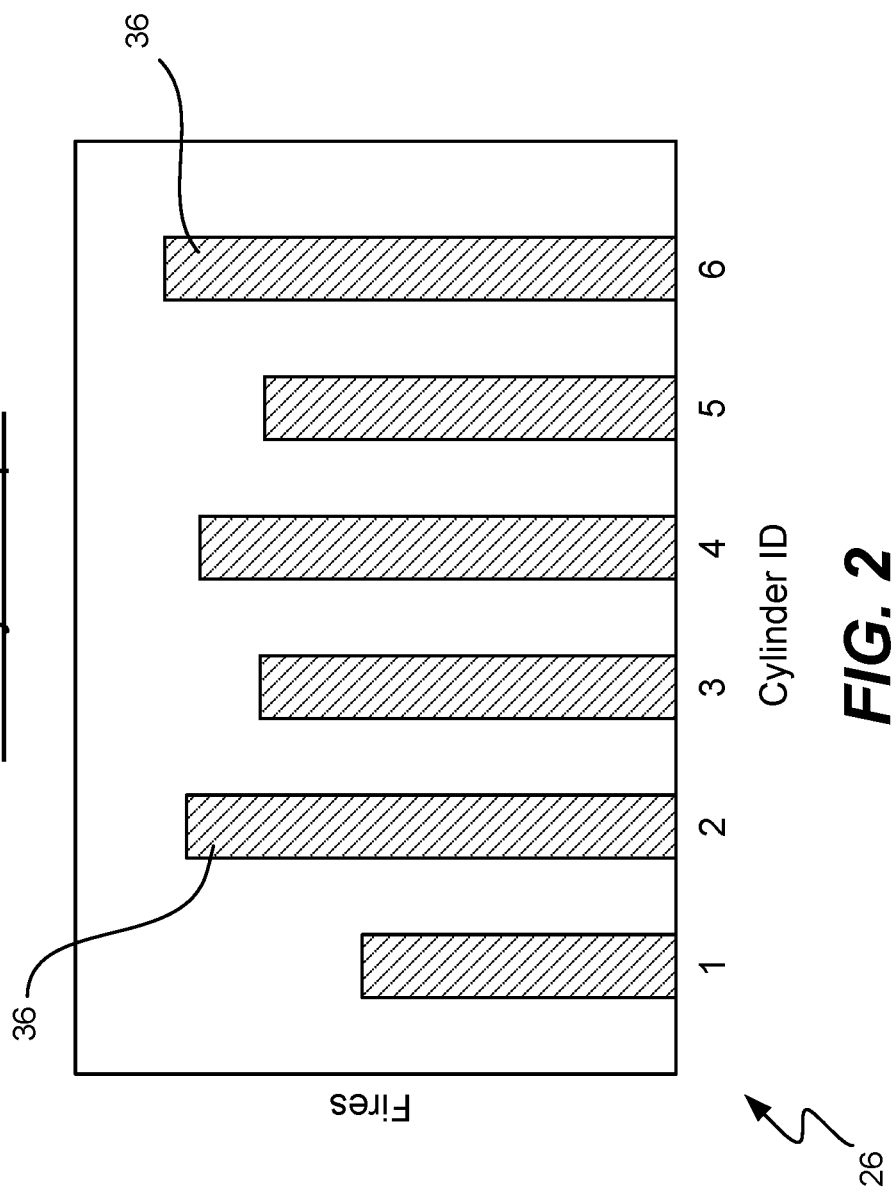
FIG. 2 illustrates a running cylinder event history for the cylinders of an exemplary six-cylinder ICE in accordance with a non-exclusive embodiment of the invention.

Referring to FIG. 2, an exemplary running history of one or more-cylinder events that are tracked per cylinder and maintained in storage 26 is illustrated. In this example, the running history is represented by a bar graph that shows the count of cylinder firings 36 for each cylinder 1 through 6. As the ICE 12 is operated, the running count of fires 36 for each cylinder 14 is incremented. As a result, the cylinders that have been fired the least number of times over prolonged operation of the ICE 12 becomes evident.

It is noted that cylinder events counted and depicted in FIG. 2 are merely exemplary and in no way should be construed as limiting. On the contrary, a wide variety of different cylinder and/or valve events for each of the cylinders 14 of the ICE 12 may be counted and a running total maintained in the storage 26. Besides the running count of fires 36, other cylinder events that may be counted include skips, intake valve activations, intake valve deactivations, exhaust valve activations, exhaust valve deactivations, re-intake events, re-exhaust events; recharge events, reactivation events, deactivation events, pumping events, the number of Oil Control Valve (OCV) solenoid switches from an active state to an inactive state or from the inactive state to the active state, and/or the number of fuel pulses that have been injected. Again, this list is not exhaustive and other cylinder events may be counted. Generally, tracking skips versus fires allows equalization of injector usage, while tracking the change from activation to deactivation allows equalization of solenoid use for example.

Cylinder History Resets

The running history of one or more-cylinder events that are tracked and counted per cylinder can run indefinitely or can be periodically reset. Either way, the running count is typically stored in memory 26.

In one non-exclusive embodiment, the history of the counted cylinder events is maintained over a lifetime of operation of the ICE 12. That is when the ICE 12 is new and started for the first time, the counting of the cylinder events begins and is not reset.

In alternative embodiments, however, the history of the counted cylinder events can be periodically reset. For example, the reset can occur when a predetermined period of time expires. The definition for the predetermined period of time may widely vary. The predetermined period of time may be a fixed time interval of operation of the ICE 12, such as every 30 minutes, every hour, every day, weekly monthly, etc. Alternatively, the predetermined period of time may be tied to some type of event or milestone, such as every thousand miles, every service check of the ICE 12. It is noted that the listed periods of time and/or milestones are merely exemplary and should not be construed as limiting in any regard. On the contrary, any time period and/or milestone may be used as the reset event.

In yet another alternative embodiment, the reset occurs each time the ICE is shut down by a "key-off". Upon another start of the ICE 12, the counting is reset, and the history of the counted cylinder events begins anew.

As noted above, the memory 26 can be either volatile or non-volatile. As a rule, embodiments that require the running history be maintained after the ICE 12 is shut down by a "key-off" require some form of non-volatile memory. On the other hand, with embodiments where the running history is maintained only during operation of the ICE 12 and then reset after a key-off, then volatile memory can be used.

Firing Sequence and Different Non-Rotating Firing Patterns

In FIG. 3A, an exemplary firing sequence of (1-5-3-6-2-4) for the ICE 12 is illustrated. With this firing sequence, the working cycles of the six-cylinders 14 shown in FIG. 1 follow the sequence (1-5-3-6-2-4) during each engine cycle. It should be noted that this engine cycle is merely exemplary and the six-cylinders 14 of the ICE 12 can be sequenced in other sequence orders.

As noted above, the six-cylinders 14 of the ICE 12 are capable of operating at variable reduced displacements of firing fractions of ⅙, ⅓rd, ½ and ⅔rds and ⅚th. For the sake of simplicity, a plurality of different non-rotating patterns for only ⅓rd, ½ and ⅔rds are illustrated in FIG. 3B through FIG. 3D. Specifically:

FIG. 3B shows three different non-rotating patterns A, B and C for the $⅓^{rd}$ firing fraction where for each pattern two different cylinders are continually fired (as designated by an "X"), while the remaining four cylinders in each case are continually skipped (as designated by an "O").

FIG. 3C shows two different non-rotating patterns D and E for the ½ firing fraction where for each pattern three different cylinders are continually fired (as designated by an "X"), while the remaining three cylinders in each case are continually skipped (as designated by an "O").

FIG. 3D shows three different non-rotating patterns F, G and H for the ⅔rd firing fraction where for each pattern four different cylinders are continually fired (as designated by an "X"), while the remaining two cylinders in each case are continually skipped (as designated by an "O").

With each the non-rotating patterns A through H the six individual cylinders 14 are either fired, or skipped, as depicted in FIGS. 3B through 3D in their working cycle sequence order 1, 5, 3, 6, 2, 4 respectively.

Again, it is noted that multiple rotating patterns can be used for firing fractions of $⅙^{th}$ and $⅚^{th}$ as well. For the sake of brevity, examples are not provided herein.

Selecting Non-Rotating Patterns

Figure 4:
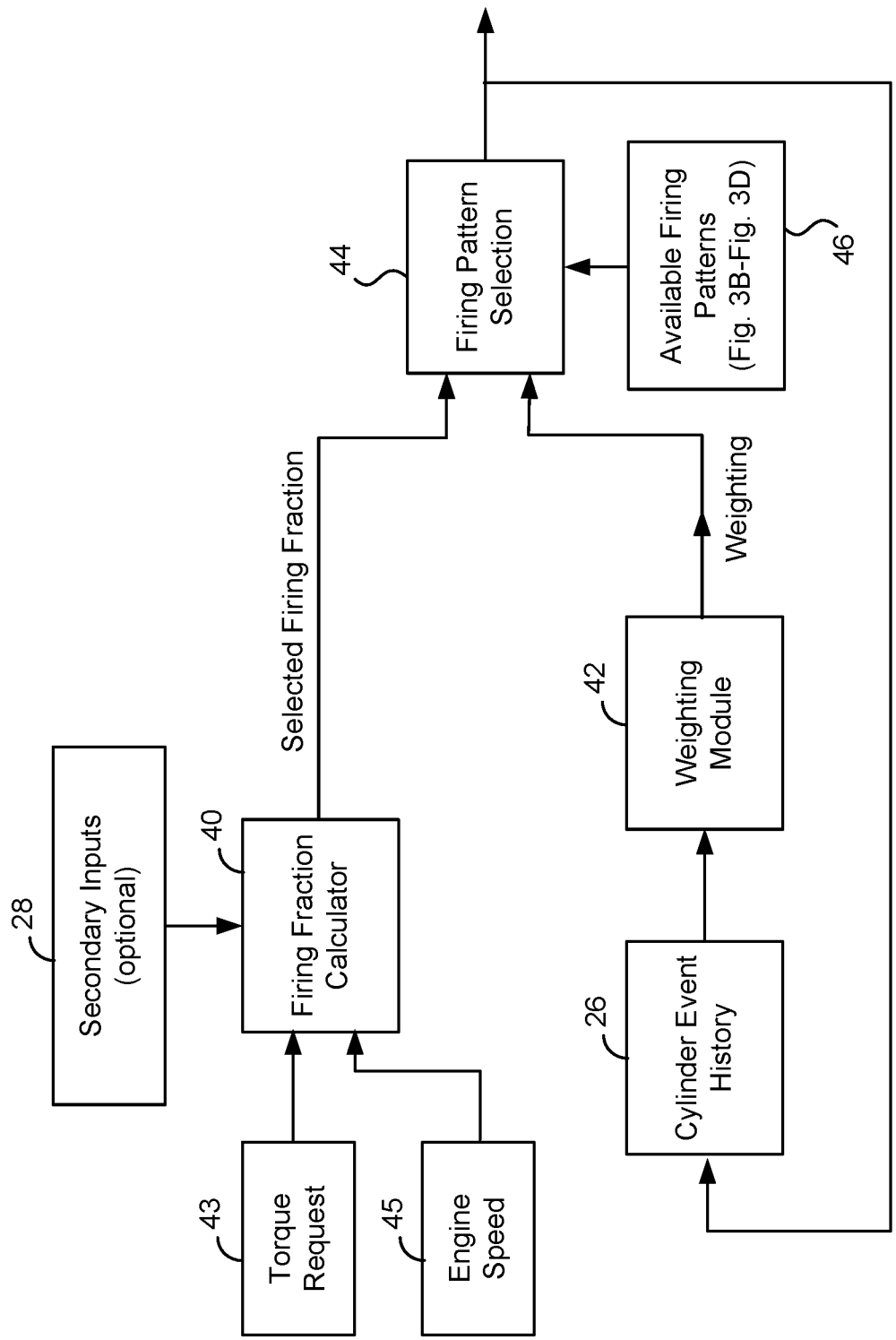
FIG. 4 is a logic block diagram implemented by the engine controller for selecting a least used non-rotating firing pattern based on the cylinder event history in accordance with a non-exclusive embodiment of the present invention.

Referring to FIG. 4, a logic module diagram for the controller 24 is illustrated. The controller 24 includes a firing fraction calculator module 40, optional weighting module 42 that weights the running history count of cylinder events maintained in memory 26, and a firing pattern selection module 44 that selects a non-rotating pattern, among the available different non-rotating firing patterns 46 as provided in FIG. 3B through FIG. 3D, for each firing fraction less than one (1).

During operation, the firing fraction calculator module 40 receives a torque request 43, and optionally engine speed 45 and/or one or more secondary inputs 28 (described in detail below). In response, the firing fraction calculator module 40 selects a suitable firing fraction, among several possible firing fractions, as is well known in the art. Again, using the six-cylinder ICE 12 as an example, when the torque request does not require full displacement (i.e., a firing fraction=1), then the available firing fractions are $⅙^{th}$, $⅓^{rd}$, ½, ⅔rds and/or ⅚th, and the firing fraction calculator module 40 selects the firing fraction that is most suitable for the given torque request.

The optional weighting module 42 weights the running count of cylinder events maintained in memory 26. Certain counted cylinder events may be more pertinent regarding cylinder wear and tear than others. For example, piston seals tend to fail before other components of a cylinder, such as intake and/or exhaust valves. In certain non-exclusive embodiments, it may be prudent to more heavily weight the cylinder events that place a stress on pistons seals, as opposed to another cylinder events which cause less wear to the piston seals. Again, this example is merely illustrative and is not intended to be limiting in any regard. On the contrary, any of the above-listed components of a cylinder that are subject to wear and tear, as well as all of the different cylinder events that may be counted, may be selectively weighted relative to one another in any suitable manner.

The firing pattern selection module 44 receives both the selected firing fraction and the cylinder event history which optionally may be weighted. In response, the firing pattern selection module 44 selects one of the non-rotating available patterns 46 for the each of the firing fractions less than one (1). Specifically, one of patterns A, B or C is selected for the $⅓^{rd}$ firing fraction, one of patterns D or E is selected for the ½ firing fraction, and one of F, G or H is selected for the firing fraction of ⅔rds.

In a non-exclusive embodiment, the firing pattern selection module 44 relies on one or more "least-used" algorithms in making the non-rotating pattern selections. Several exemplary non-exclusive least-used algorithms include:

(1) A selection of a firing pattern based on the cylinder having the lowest cylinder event count. Using an example of a firing fraction of $⅓^{rd}$, and cylinder number one (1) being activated the least number of times (as depicted in FIG. 2), then this least-used algorithm selects pattern A because cylinder 1 is specified to be fired, while patterns B and C call for a skip;

(2) A selection of a firing pattern is made based on the lowest average of the counted cylinder events among the cylinders defined in each pattern patterns respectively. For example, for a firing fraction of ½, if the average number of counted cylinder events for the cylinders 1-2-3 is less than 4-5-6, then pattern E is selected; or (3) Ascertaining a most used cylinder among the cylinders of the ICE. Once the most used cylinder is defined, then selecting the non-rotating firing pattern based on avoiding use of the most used cylinder.

The least used algorithms (1) and (2) described above are merely exemplary. Other algorithms may be used as well. Regardless of which algorithm is used, the selection of non-rotating patterns on a least-used basis as determined from the running count of cylinder events aids in evenly spread usage among the cylinders, mitigating uneven usage and early wear and tear, and potentially premature failure, of otherwise overly used cylinders.

Secondary Inputs

As noted above, the controller may receive one or more secondary inputs that may result in revision and/or change of the selected firing fraction used to operate the ICE 12. These secondary inputs may include, but are not limited to, a sensor input indicative of the rotational speed of the turbine of the turbo system 22, a sensor input indicative of the flow rate of fresh air through the intake manifold 16, and a predicted or measured operating temperature of the aftertreatment system 20. As explained below, the controller 24 may optionally revise the selected firing fraction in response to one or more of these inputs to control the rotational speed of the turbine of the turbo system 20, the rate of air flow through the intake manifold 16, and/or the operating temperature of the aftertreatment system 20.

Controlling Turbo Rotational Speed

When cylinders 14 intake and exhaust valves are deactivated, there tends to be a decrease in the flow of air pumped through the ICE 12, which in turn decreases the volume of exhaust gases passing through the exhaust manifold 18. With Cylinder Deceleration Cut Off (DCCO) for example, all the cylinders are skipped, and their valves deactivated to minimize air flow through the ICE and into the aftertreatment system 20. As a result, the rate at which the turbine of the turbo system 22 spins may significantly decrease. If the rotational speed of the turbine falls below a threshold, however, the turbo system 22 may lose its ability to provide a boost to the ICE 12 and/or may take too long to spin up, resulting in a delay of acceleration.

In the event the turbine rotational speed falls below any of one or more threshold(s), the controller 24 may optionally implement one or more strategies. First, the controller 24 can command the firing of more cylinders 14, which results in more exhaust gasses passing through the exhaust manifold 18. Second, air can be pump through one or more cylinders by activating intake and exhaust valves of skipped cylinders to allow air to pump through the cylinder chambers.

Figure 5:
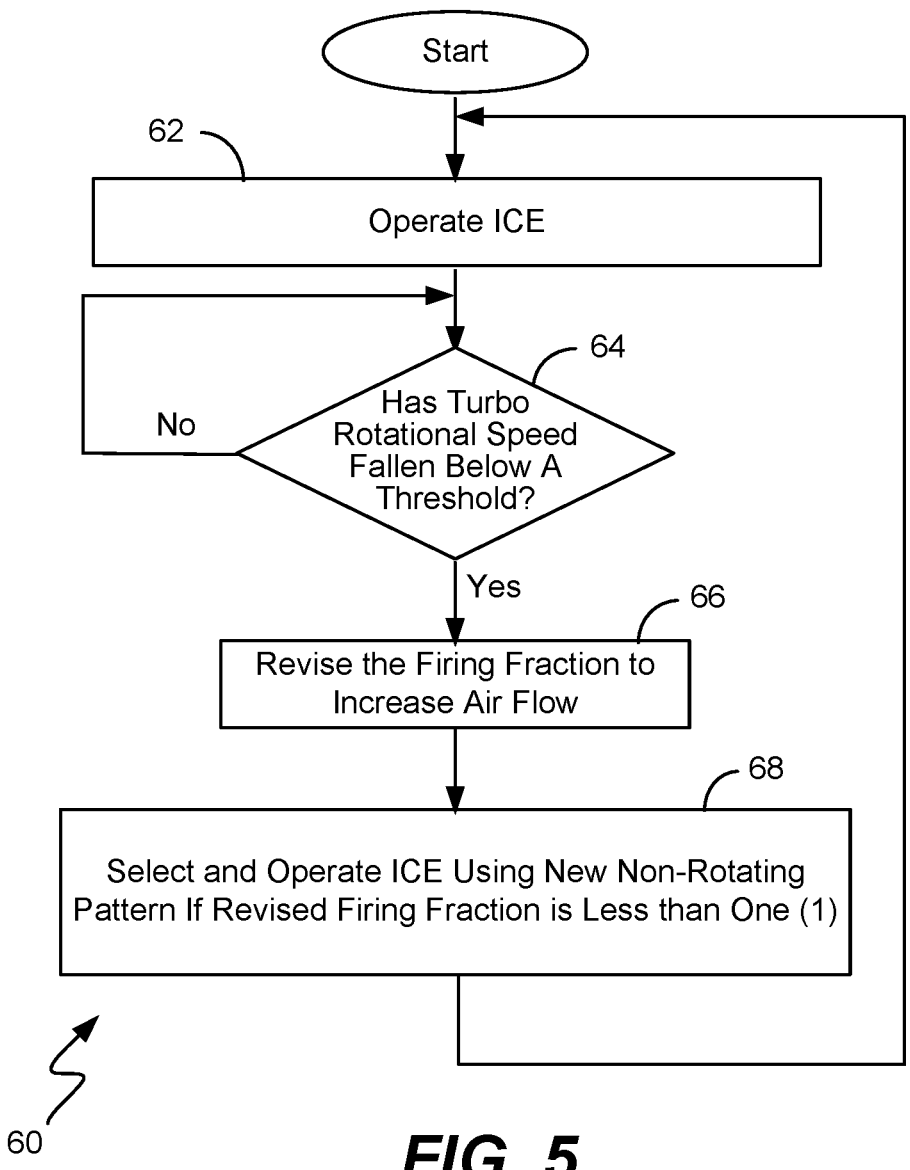
FIG. 5 is a flow diagram illustrating how revising a valve activation pattern can be used to control a turbine spinning rate of a turbo system in accordance with a non-exclusive embodiment of the invention.

Referring to FIG. 5, a flow diagram 60 illustrating how the controller 24 may be used to control the rotational speed of the turbine of the turbo system 22 is illustrated.

In step 62, the controller 24 operates the ICE 12.

In decision step 64, the rotational speed of the turbine of the turbo system 22 is continually monitored. If the rotational speed remains above a threshold, then the controller 24 operates the ICE 12 as provided in step 62, or until some other event occurs that requires a change, such as a demand for more torque and a transition to a new firing fraction.

If the rotational speed falls below the threshold, then the controller 24 takes steps to increase the flow rate of gasses through the exhaust manifold 18.

In step 66, the controller 24 increases valve activations by revising the current firing fraction to a new firing fraction that has a higher firing density. Optionally, the controller 24 may also increase the valve activations by increasing pumping as well.

In step 68, the controller 24 selects a new non-rotating pattern, based on the cylinder event history, as appropriate for the revised firing fraction (assuming the revised firing fraction is less than one (1).

The steps 62 through 68 are optionally continually repeated. In this way, the rotational speed of the turbo turbine is maintained above the threshold during operation of the ICE 12.

Increasing Air Fuel Ratio at Altitude

At or close to sea level, the atmospheric pressure is at or close to 1 bar of pressure. With an increase in altitude, the atmospheric pressure drops. This drop in pressure may negatively affect the operation of the ICE 12 because the charge provided to the cylinders 14 may have less air at elevation compared to sea level.

Consider an example of the ICE 12 operating at a firing fraction of ½ at sea level and having a charge with an Air Fuel Ratio (AFR) that is calibrated to be 30. When the ICE 12 is operating at the same ½ firing fraction and torque output, but an elevation of 10,000 feet, the AFR will be significantly less since the ambient barometric pressure is approximately 65% to 70% of pressure at sea level. As a result, the AFR may drop to below the smoke limit for certain types of ICEs, such as Diesel engines. Also, the turbo may surge because of the reduced mass flow rate. When the mass flow rate is reduced, the compressor operates close to the surge/unstable region.

To avoid such issues, the controller 24 may elect to revise the firing fraction and/or other measures to increase the number of intake valve activations of the cylinders. With a higher intake valve activation density, air flow is increased, and more air is inducted into the intake manifold 16, mitigating the above-mentioned issues.

When deciding on increasing the intake valve activations, the controller 24 may consider several factors, such as but not limited to NVH, pumping losses, turbo speeds, Exhaust Gas Recirculation (EGR), increased fuel consumption, etc. In various alternative embodiments, the increased target for the intake valve activation frequency can be obtained by using an algorithm, indexing a look up table, or any other suitable means, including possibly firing all the cylinders of the ICE 12.

Figure 6:
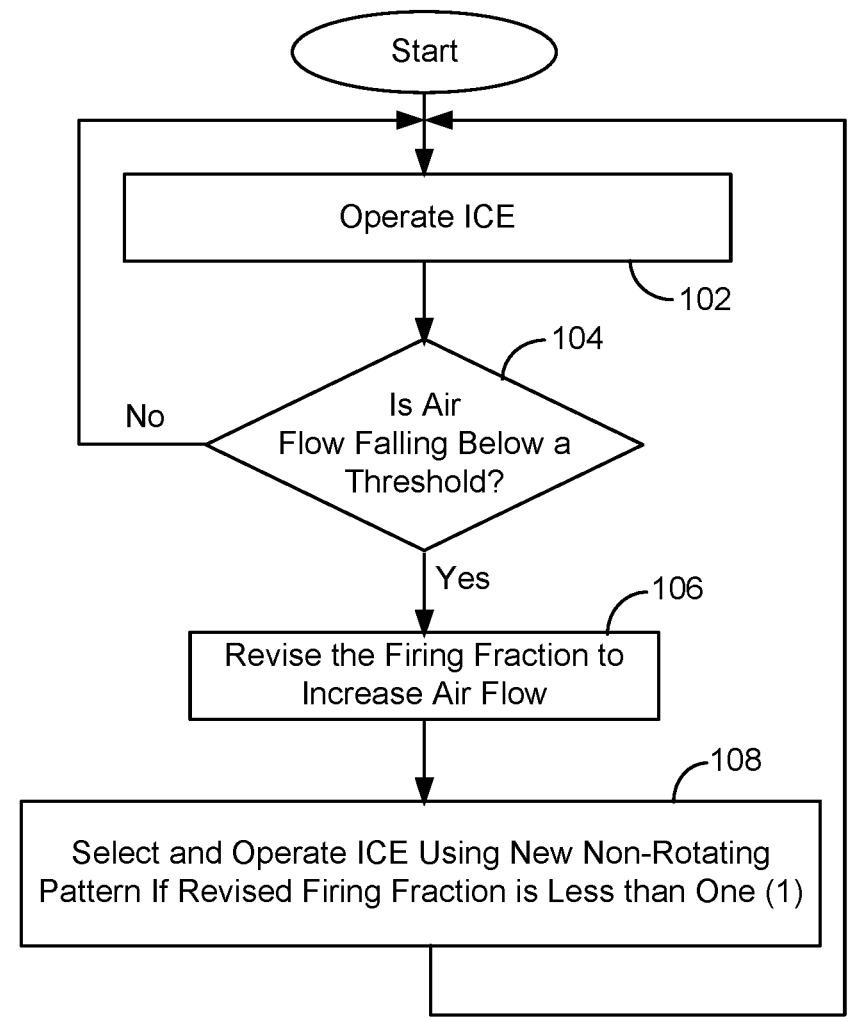
FIG. 6 a flow diagram illustrating how an Air Fuel Ratio (AFR) can be adjusted by increasing air flow by revising a valve activation pattern in accordance with a non-exclusive embodiment of the invention.

Referring to FIG. 6 a flow diagram 100 illustrating how air flow can be increased by revising an intake valve activation pattern is illustrated.

In step 102, the ICE 12 is operated.

In decision step 104, the air flow to the ICE 12 is continually measured or predicted. If the air flow remains above a threshold, the ICE continues to operate as provided in step 102.

On the other hand, if the air flow falls below the threshold, then in step 106 the controller 24 revises the firing fraction to a higher firing density to increase the air flow.

Optionally, the controller 24 may also increase the valve activations by increasing pumping as well.

In step 108, a new non-rotating pattern is selected for the revised firing fraction less than one (1). Again, such a selection may be made based on the cylinder event history maintained in storage 26.

The steps 102 through 108 are optionally continually repeated. In this way, the air flow is maintained above the threshold during operation of the ICE 12.

Managing Firing Fraction Transitions

Abrupt transitions of firing fractions with the ICE may result in excessive Noise, Vibration and Harshness (NVH). As a result, it is often advantageous to (1) use intermediate firing fraction between a first firing fraction and a target second firing fraction, (2) spread out cylinder firings, and (3) limit multiple skips just prior to a fire.

Consider an example of the ICE operating at a firing fraction of ⅔rds using pattern H and a decision is made to transition on cylinder 3 to a firing fraction of ⅓rd. If the firing pattern B happens to be selected based on a least-used algorithm formulated to mitigate unequal cylinder firings, an immediate transition to pattern B may result in excessive NVH if adjacent cylinders are fired. because the resulting combination of patterns during the transition will have three fires in a row (1-5-3), which is an increase in the firing density compared to the desired decrease from firing fractions of ⅔rds to ⅓$^{rd}$. Consequently, it may be advantageous to temporarily use a different intermediate pattern A or C that improves NVH by reducing adjacent firings. Once the transition to the intermediate pattern is complete, then another transition can be made to the desired pattern B.

Also, consider a complement example of the ICE operating at a firing fraction of ⅓ and pattern A and a decision is made to on cylinder 1 to transition to a firing fraction of ⅔rds. In this case, the desired least-used non-rotating firing pattern may be pattern F, which will however result in three successive skips (2-4-1), which decreases the desired firing density below ⅓ instead of the desired increase to ⅔rds. Consequently, either pattern G or H may be used as an intermediate to reduce NVH by avoiding multiple skips before a fire. Once the intermediate transition is complete, another transition to pattern F is made.

Figure 7:
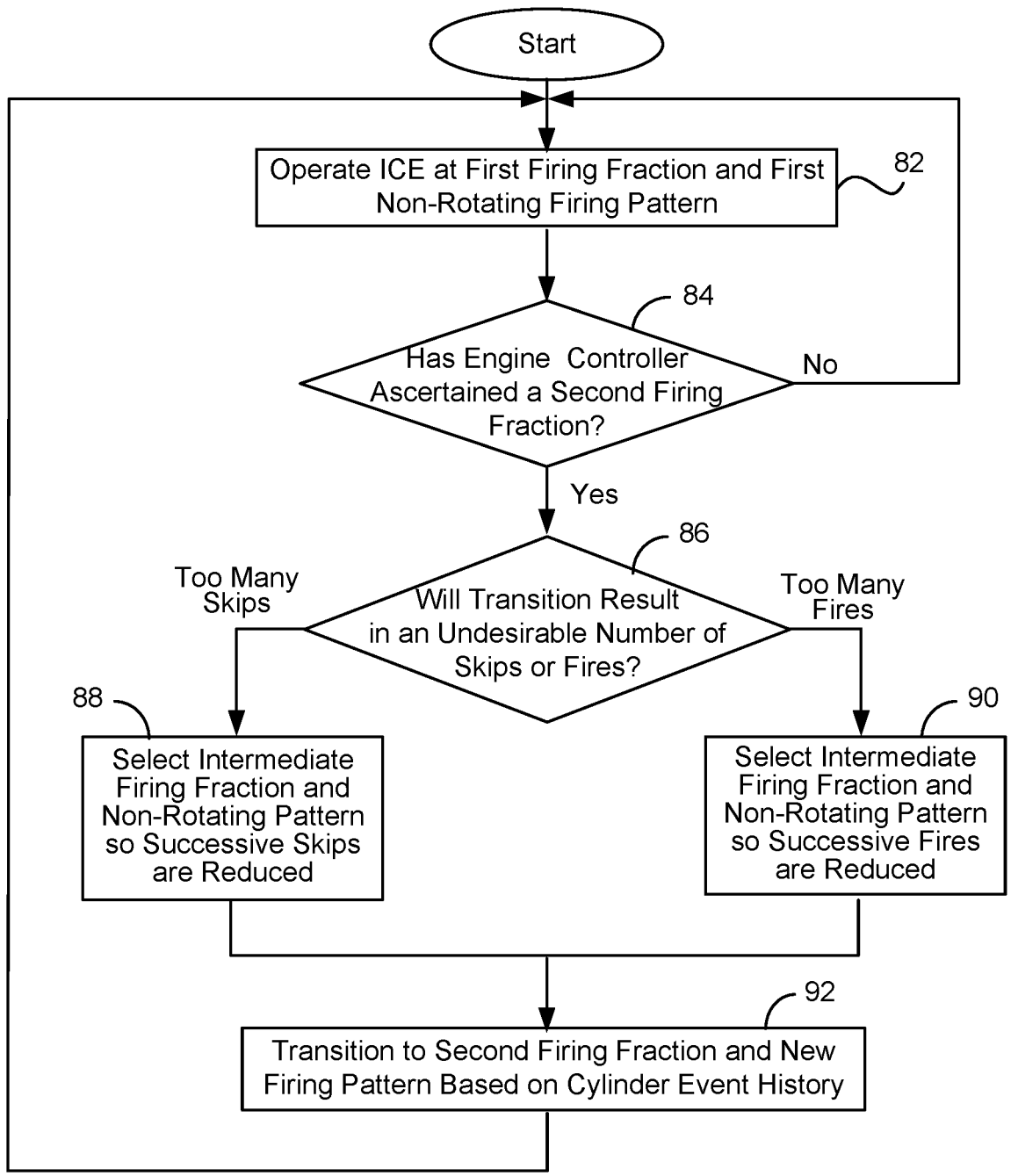
FIG. 7 is a flow diagram illustrating how Noise, Vibration and Harshness (NVH) can potentially be reduced during firing fraction transitions in accordance with a non-exclusive embodiment of the invention.

Referring to FIG. 7, a flow diagram 80 illustrating how NVH is potentially reduced during firing fraction transitions is illustrated.

In step 82, the ICE 12 is operated at a first firing fraction and a first non-rotating pattern assuming the first firing fraction is less than one (1).

In step 84, a decision is made to operate the ICE 12 at a second firing fraction.

In decision 86, a determination is made if the second firing fraction will result in either (i) too many successive skips, or (ii) too many successive fires In step 88, an intermediate non-rotating pattern may optionally be used to avoid too many successive skips.

Alternatively in step 90, an intermediate non-rotating firing pattern may optionally be used to avoid to many successive fires.

In step 92, a transition is made to the second firing fraction and a non-rotating pattern selected with a least-used algorithm and based on the cylinder event history. The transition is either (a) after the use of an intermediate firing fraction and rotating pattern per steps 88 or 90 or made directly without an intermediate firing fraction if the transition results in an acceptable number of skips or fires.

The above steps 82 through 92 are continually repeated so that NVH is mitigated during multiple firing fraction transitions during operation of the ICE 12.

Thermal Management of the Aftertreatment System

The operating temperature of the aftertreatement system 20 can also be managed or controlled by operating the ICE 12 in several different ways. Generally, if the aftertreatment system is operating at a temperature of 200° C. or less, such as for example following a cold start, active steps can be taken to rapidly increase the temperature. Such active steps may include changing the firing density and/or the amount of fuel used to generate a given amount of torque. Once the aftertreatment system has reached its warm operating temperature, then steps can be taken to operate the ICE 12 in a "fuel economy mode" by not burning excess fuel while keeping the aftertreatment system 20 in a warm state. Consequently, the ICE 12 is typically operated at a firing density needed to meet torque demands, but no excess fuel is burned. Alternatively, the controller 24 can take steps to cool the aftertreatement system 20. By increasing the pumping rate, cool air can be introduced into the aftertreatments system 20, reducing its operating temperature.

The controller 24 can further manage the ICE 12 so that the aftertreatment system 20 can operate in additional modes as well. Such modes may include a Diesel Particulate Filter (DPF) regeneration mode, and a SCR catalyst desulfurization (DeS Ox) mode. The DPF regen mode is arranged to burn off particulate matter at a temperature range of approximately 500° C. or higher. A DeSOx mode is used to remove sulfur deposit from the aftertreatement system 20. With the DeSOx mode, the operating temperature of the aftertreatment system 20 is approximately 600° C.

With each of these modes, a minimum threshold temperature of the aftertreatments system is specified. By selectively choosing the firing density and/or the amount of fuel burned, the controller 24 can be effectively control the aftertreatment system 20 to reach any of these temperature thresholds.

Figure 8:
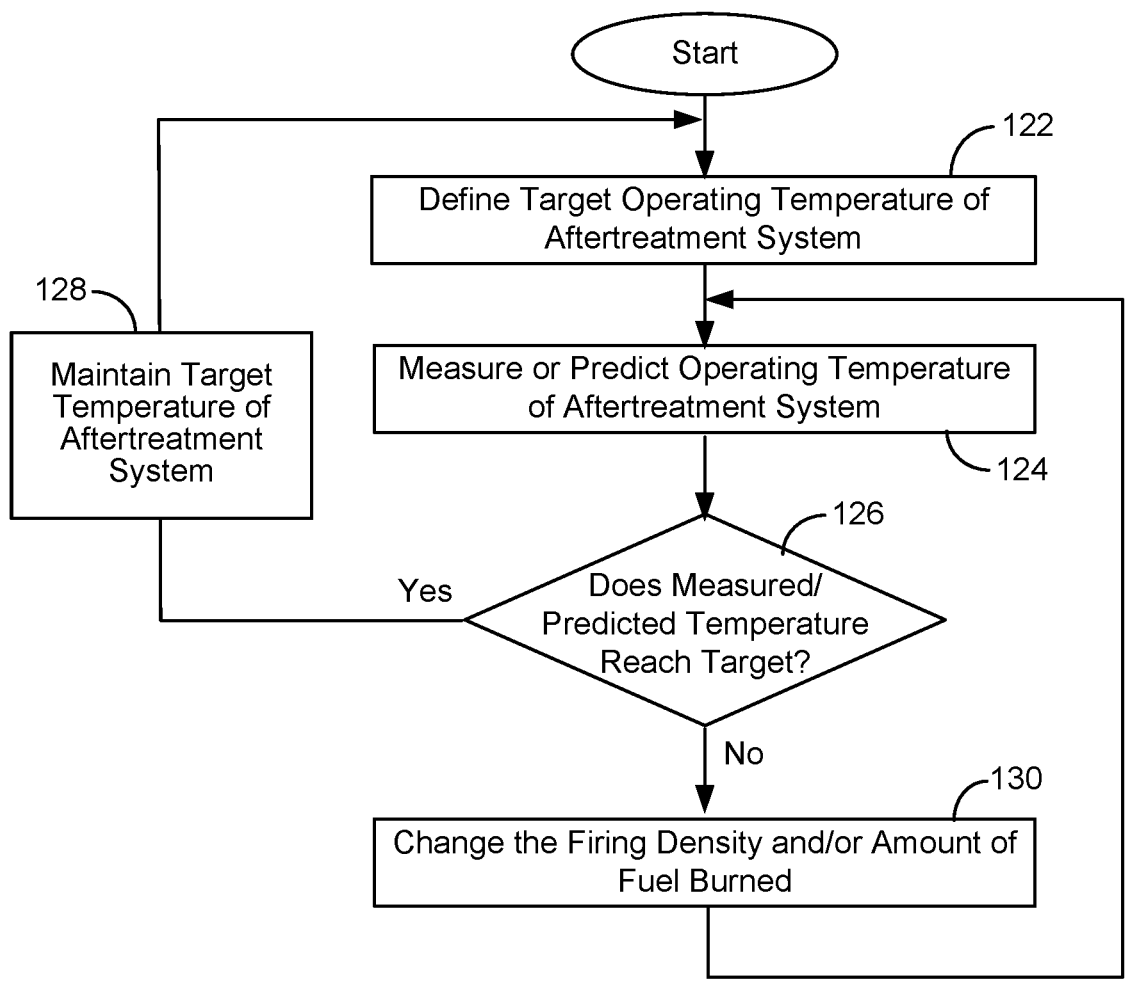
FIG. 8 is a flow diagram illustrating how an operating temperature of an aftertreatment system associated with the ICE can be managed in accordance with a non-exclusive embodiment of the invention.

Referring to FIG. 8, a flow diagram 120 illustrating how an operating temperature of an aftertreatment system of an ICE can be managed or controlled is illustrated.

In step 122, a target operating temperature of the aftertreatment system 20 is defined. The target operating temperature may vary, depending on the mode the controller 24 would like the aftertreatment system 20 to operate. As noted above, the target may be approximately 250° C. to maintain the aftertreatment system 20 in a warm mode and approximately 500° C. to burn off particulates in the DPF regen mode, or approximately 600° C. to remove sulfur from the aftertreatment system 20.

In step 124, the operating temperature of the aftertreatement system 20 is either (a) measured using a sensor located in or proximate to the aftertreatment system 20, or (b) it is predicted using a prediction algorithm. With the latter, an algorithm is used to predict the operating temperature from inputs such as period of operation of the ICE 12, number of firings, number of skips, amount of fuel burned, etc.

In decision step 126, the measured or predicted operating temperature is compared to a target temperature If the measured or predicted operating temperature reaches the target, then the controller 24 operates the ICE 12 to maintain the aftertreatement system 20 at the target operating temperature in step 128.

On the other hand, if the measured or predicted operating temperature is below the target, then the controller 24 takes steps to operate the ICE 12 to rapidly increase the operating temperature of the aftertreatment system 20.

In step 130, the steps taken by the controller 24 may include changing the firing fraction or firing density of the ICE 12, directing the ICE 12 to burn more fuel, or a combination of both. By changing the firing fraction and/or the amount of fuel burned, the ICE 12 can be operated in various modes with respect to the aftertreatment system 20, including (a) a get-warm mode, (b) a keep-warm mode, (c) a DPF burn-off mode, a (d) DeSOx mode, etc. In some embodiments, the controller 24 may limit the number of firing fractions that may be used when operating in a thermal management mode.

Steps 122 through 130 are continually repeated so that controller 24 is continually operating the ICE 12 to either maintain the target operating temperature or attempting to actively increase the temperature to reach the target.

Strategies for Decreasing Wear and Preventing the Burning of Oil

As noted above, cylinder recharges are used to refresh and maintain the pressure within the cylinders sufficiently high to reduce or prevent oil from being sucked into the combustion chamber. Reactivations are used to prep a cylinder for a fire after one or more skips using one of the above-mentioned pneumatic springs, such as an Air Spring (AS). These strategies include:

1. For one or a relatively small number of skip since a last fire or recharge event and a scheduled fire in the next working cycle, inject fuel into the cylinder without an air intake in the working cycle to be fired;
2. For multiple skips within a predetermined range (e.g., 2 to 20 skips) before a scheduled fire, exhaust the cylinder on the last skip, and in the next working cycle scheduled to be fired, recharge by opening the intake valves, fuel, and fire. In this manner, the intake valve(s) is/are not opened into excess cylinder pressure, preventing valve damage and noise, but oil in the chamber is exhausted unburnt into the aftertreatment system 20; and
3. For multiple skips more than the predetermined range, do not open the exhaust valve (or intake valve) on the last skip, so the cylinder is not exhausted before the fire. In the next working cycle scheduled to be fired, recharge by opening the intake valves, fuel and fire. In this manner, no oil is exhausted into the aftertreatment system 20, and the internal cylinder pressure will be low enough to avoid valve damage and excess noise.

It is noted that the predetermined range provided above is merely exemplary. Preferably, the predetermined range is defined or otherwise limited to prevent oil from being sucked into the cylinder chambers before a recharge event. The range may therefore vary for different ICEs and/or spring type.

Alternating Different Non-Rotating Firing Patterns

In another non-exclusive embodiment, the variable displacement ICE 12 can be operated to even-out usage of the cylinders 14 by sequencing through in a predefined order multiple different non-rotating firing patterns for each reduced effective displacement.

Figure 9:
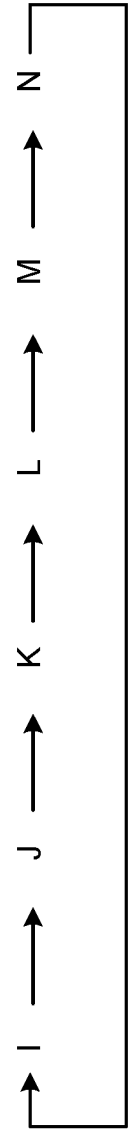
FIG. 9 is a diagram illustrating how multiple different non-rotating firing patterns for each reduced effective displacement are predefined and sequenced through to even out usage among the cylinders of the ICE over time in accordance with a non-exclusive embodiment of the invention.

Referring to FIG. 9 is a diagram illustrating how multiple different non-rotating firing patterns for a given reduced effective displacement are sequenced through in a predefine order to even out usage among the cylinders over time. In this example, the given firing fraction is $\frac{1}{6}^{th}$ and the different non-rotating firing patterns are labeled I through N. With each of the non-rotating patterns I through N, one different cylinder is specified to be fired, while the remaining five cylinders are skipped.

During operation, each time the ICE 12 is commanded to operate at the firing fraction of $\frac{1}{6}^{th}$, the pattern I through N next in the predefined order is selected to be used. In this manner, the first, second, third, fourth, fifth and sixth time the engine controller commands the ICE 12 operate at a firing fraction of $\frac{1}{6}^{th}$, then the patterns I, J, K, L, M, and N are successively used in that order respectively. After the N pattern is used, the above sequence can be repeated in the predefined order, or a different order may be used. In this way, the usage of the individual cylinders 14 is substantially equalized, while uneven usage of the cylinders is mitigated.

It should be noted that the $\frac{1}{6}^{th}$ firing fraction example provided in FIG. 9 is merely exemplary and should not be construed as limiting in any respect. On the contrary, a similar alternating methodology can be used for any firing fraction less than one and having different firing patterns.

Skip Fire Embodiments

While the present invention has been discussed mostly in the context of cylinder deactivation (CDA) relying on non-rotating firing patterns, it should be understood the present invention is also applicable to skip fire engine control as well. With skip fire engine control, the ICE can be operated at one or more different firing fractions each less than (1), each of which represent an effective reduced displacement that is less than full displacement for the ICE. When a skip-fire controlled ICE is operating at a firing fraction that is less than one, at least one cylinder is fired, skipped and either fired or skipped over three successive working cycles. In one variation of skip-fire, ICE may be dynamically controlled, meaning skip or fire decisions are made on a working cycle-by-working cycle basis or an engine cycle-by-engine cycle basis. In yet another variation of skip fire, the torque output of fired cylinders can be modulated to one of several different levels. This latter variation of skip fire is often referred to as Multi-level Miller-cycle Dynamic Skip Fire (mDSF). With each of these skip fire embodiments, a cylinder or a group of cylinders may be selected for implementing a given firing fraction less than one (1) based on any of the least recently used algorithms described herein.

Although only a few embodiments have been described in detail, it should be appreciated that the present application may be implemented in many other forms without departing from the spirit or scope of the disclosure provided herein. Therefore, the present embodiments should be considered illustrative and not restrictive and is not to be limited to the details given herein but may be modified within the scope and equivalents of the appended claims.

What is claimed is:

1. An engine controller configured to control operation of cylinders of a variable displacement internal combustion engine (ICE), the engine controller configured to:
   (a) ascertain a firing fraction less than one (1) for a received torque request, the ascertained firing fraction suitable for operating the cylinders of the variable displacement ICE so that sufficient torque is generated to meet the received torque request;
   (b) select a firing pattern, among different firing patterns each associated with the ascertained firing fraction that is less than one (1), the selection based on a history of counted and weighted multiple cylinder events for the cylinders of the variable displacement ICE respectively;
   (c) operate the variable displacement ICE at the ascertained firing fraction using the selected firing pattern, wherein the different firing patterns define non-rotating patterns for the cylinders that are different from one another respectively,
   the non-rotating patterns differentiated from one another by different groups of cylinders that are continually fired and continually skipped respectively; and
   (d) schedule and implement a recharge or reactivation of at least one cylinder of the ICE while operating the ICE at the selected firing pattern.

2. The engine controller of claim 1, wherein the selection of the firing pattern that is less than one (1) is made based on a least used value derived from the history of counted and weighted multiple cylinder events of the cylinders of the variable displacement ICE.

3. The engine controller of claim 2, wherein the least used value is derived from one of the following:
   a cylinder, among all the cylinders of the ICE, having a lowest number count of the counted and weighted multiple cylinder events;

a lowest average of the counted and weighted multiple cylinder events among the group of fired cylinders included in each of the different firing patterns respectively; or avoiding a most used cylinder.

4. The engine controller of claim 1, wherein the counted and weighted cylinder events for each of the cylinders of the ICE include one two or more of the following:
(e) a number of cylinder fires;
(f) a number of cylinder skips;
(g) a number of intake valve activations;
(h) a number of intake valve deactivations;
(i) a number of exhaust valve activations;
(j) a number of exhaust valve deactivations;
(k) a number of re-intake events;
(l) a number of re-exhaust events;
(m) a number of recharge events;
(n) a number of reactivation events;
(o) a number of deactivation events;
(p) a number of Oil Control Valve (OCV) solenoid switches from an active state to an inactive state or from the inactive state to the active state;
(q) a number of fuel pulses that have been injected.

5. The engine controller of claim 1, wherein the history of the counted and weighted multiple cylinder events is maintained over a lifetime of operation of the variable displacement ICE.

6. The engine controller of claim 1, wherein the history of the counted and weighted multiple cylinder events begins at a start of a predetermined period of time during which the variable displacement ICE is operated, and when the predetermined period of time expires, the history of the counted cylinder events is reset.

7. The engine controller of claim 1, wherein the history of the counted and weighted multiple cylinder events is reset with a start of the variable displacement ICE and counts during operation of the variable displacement ICE until the variable displacement engine is turned off.

8. The engine controller of claim 1, further configured to minimize unequal firings among the plurality of cylinders by repeating (a) through (c) as different torque requests are received and ascertained during operation of the variable displacement ICE.

9. The engine controller of claim 1, further configured to:
revise the ascertained firing fraction if a rotational speed of a turbo system associated with the variable displacement ICE falls below a threshold; and
operating the variable displacement ICE at the revised firing fraction and a second firing pattern associated with the revised firing fraction to increase the rotational rate of the turbo system.

10. The engine controller of claim 1, further configured to:
ascertain a second firing fraction;
ascertain if an undesirable number of skips will occur with an immediate transition to the second firing fraction,
select an intermediate firing fraction and an intermediate non-rotating pattern so that the undesirable number of skips is avoided; and
after operating at the intermediate firing fraction and intermediate non-rotating pattern, operate the variable displacement ICE at the second firing fraction and a second firing pattern selected based on the history of counted and weighted multiple cylinder events for the cylinders and associated with the second firing fraction.

11. The engine controller of claim 1, further configured to:
ascertain a second firing fraction;
ascertain if an undesirable number of fires will occur with an immediate transition to the second firing fraction,
select an intermediate firing fraction and an intermediate non-rotating pattern so that the undesirable number of fires is avoided; and
after operating at the intermediate firing fraction and intermediate non-rotating pattern, operate the variable displacement ICE at the second firing fraction and a second firing pattern selected based on the history of counted and weighted multiple cylinder events for the cylinders and associated with the second firing fraction.

12. The engine controller of claim 1, further configured to:
revise the ascertained firing fraction if a rate of air flow to the variable displacement ICE falls below a threshold; and
operate the variable displacement ICE at the revised firing fraction and a second firing pattern, associated with the revised firing fraction to increase the rate of air flow.

13. The engine controller of claim 1, further configured to:
ascertain a target operating temperature of an aftertreatment system associated with the variable displacement internal combustion engine;
compare the target operating temperature with a measured or predicted operating temperature of the aftertreatment system; and
if the measured or predicted operating temperature of the aftertreatment system is below the target operating temperature, operate the variable displacement ICE using one of the following until the target operating temperature is met or exceeded:
(e) changing a firing density among the cylinders;
(f) burning more fuel; or
(g) a combination of (e) and (f).

14. The engine controller of claim 1, further configured, for a cylinder that that has been skipped at least one time before a scheduled fire, injecting fuel into the cylinder without an air intake in the working cycle to be fired.

15. A method of operating cylinders of an internal combustion engine (ICE), the method comprising:
selecting a non-rotating firing pattern, among a plurality of non-rotating firing patterns, provided for operating the ICE at a firing fraction that is less than one (1), the selection of the non-rotating firing pattern based on a running history of two or more weighted cylinder events that are tracked per cylinder; and
scheduling and implementing a cylinder recharge or reactivation of at least one cylinder of the ICE while operating the ICE at the selected non-rotating firing pattern.

16. The method of claim 15, wherein the plurality of non-rotating firing patterns differ from one another by each defining different patterns of cylinders that are continually fired and continually skipped.

17. The method of claim 15, further comprising making the selection of the non-rotating firing pattern, among the plurality of non-rotating firing patterns, to mitigate unequal usage among cylinders of the ICE as determined from the running two or more weighted cylinder events that are tracked per cylinder.

18. The method of claim 17, wherein making the selection of the non-rotating firing pattern further comprising:
ascertaining a cylinder, among all the cylinders of the ICE, having a lowest number of the counted cylinder events; and
selecting the firing pattern, among the plurality of firing patterns, based on the cylinder ascertained as having the lowest number of the counted cylinder events.

19. The method of claim 17, wherein making the selection of the non-rotating firing pattern further comprising:
- ascertaining an average of the counted cylinder events for the cylinders included in each of the plurality of non-rotating firing patterns respectively; and
- selecting the non-rotating firing pattern, among the plurality of non-rotating firing patterns, having either the lowest average.

20. The method of claim 17, wherein making the selection of the non-rotating firing pattern further comprising
- ascertaining a most used cylinder among the cylinders of the ICE; and
- selecting the non-rotating firing pattern based on avoiding use of the most used cylinder.

21. The method of claim 15, wherein the two or more cylinder events that are tracked and stored per cylinder include any two or more of the following:
- (a) a number of cylinder fires;
- (b) a number of cylinder skips;
- (c) a number of intake valve activations;
- (d) a number of intake valve deactivations;
- (e) a number of exhaust valve activations;
- (f) a number of exhaust valve deactivations;
- (g) a number of re-intake events;
- (h) a number of re-exhaust events;
- (i) a number of recharge events;
- (j) a number of recharge events;
- (k) a number of reactivation events;
- (l) a number of deactivation events;
- (m) a number of Oil Control Valve (OCV) solenoid switches from an active state to an inactive state or from the inactive state to the active state;
- (n) a number of fuel pulses that have been injected.

22. The method of claim 15, further comprising generating the running history by one of the following:
- (a) counting the two or more weighted cylinder events that are tracked per cylinder over a lifetime of operation of the ICE;
- (b) resetting and then begin counting the two or more weighted cylinder events that are tracked per cylinder when the ICE is started; or
- (c) resetting and then begin counting the two or more weighted cylinder events that are tracked per cylinder when a predetermined period of time expires while the ICE is in operation.

23. The method of claim 15, further comprising:
- operating the ICE at a plurality of different firing fractions that are each less than one (1), the different firing fractions selected based at least partially on different received torque requests respectively; and
- selecting one of a plurality of different non-rotating firing patterns for each of the plurality of firing fractions that are less than one (1), the selection based on the running history of the two or more weighted cylinder events that are tracked per cylinder.

24. The method of claim 15, further comprising:
- revising the firing fraction in response to a predicted or sensed operating parameter; and
- operating the ICE at the revised firing fraction and a second non-rotating firing pattern associated with the revised firing fraction, the second non-rotating firing pattern selected based on the running history of the two or more weighted cylinder events that are tracked per cylinder.

25. The method of claim 24, wherein the predicted or sense operating parameter comprises one of the following:
- (a) rotational speed of a turbo associated with the ICE;
- (b) a temperature of an aftertreatment system associated with the ICE; or
- (c) a rate of air flow to the ICE.

26. The method of claim 15, further comprising managing transitions between a first firing fraction and a second firing fraction while operating the ICE by using an intermediate firing fraction and an intermediate non-rotating pattern such that an undesirable number of fires or skips is avoided compared to an immediate transition to the second firing fraction.

27. The method of claim 15, further comprising:
- for a cylinder that that has been skipped at least one time before a scheduled fire, inject fuel into the cylinder without an air intake in the working cycle to be fired;
- for a cylinder that has been skipped successive times within a predefined range of working cycles before a scheduled fire, exhaust the cylinder on the last skip, and in the next working cycle scheduled to be fired, recharge by opening the intake valves, fuel, and fire; and
- for a cylinder that is scheduled to be fired after successively skipped more than the predefined range of working cycles, do not open the exhaust or intake on a last skip so the cylinder is not exhausted before the fire, and in the next working cycle scheduled to be fired, recharge by opening the intake valves, fuel and fire.

28. The engine controller of claim 1, further configured to schedule and implement the recharge to maintain a pressure within the at least one cylinder sufficiently high to reduce or prevent oil from being sucked into a combustion chamber of the at least one cylinder.

29. The engine controller of claim 1, further configured to schedule and implement the reactivation to prepare the at least one cylinder for a fire after one or more skips.

30. The engine controller of claim 1, further configured to, for a cylinder that has been skipped successive times within a predefined range of working cycles before a scheduled fire, exhaust the cylinder on the last skip, and in the next working cycle scheduled to be fired, recharge by opening the intake valves, fuel and fire.

31. The engine controller of claim 1, further configured, for a cylinder that is scheduled to be fired after successively skipped more than the predefined range of working cycles, do not open the exhaust or intake on a last skip so the cylinder is not exhausted before the fire, and in the next working cycle scheduled to be fired, recharge by opening the intake valves, fuel, and fire.

32. The engine controller of claim 1, further configured to command skipped cylinders of the ICE to operate as Low Pressure Exhaust Springs (LPES).

33. The engine controller of claim 1, further configured to command skipped cylinders of the ICE to operate as High Pressure Exhaust Springs (HPES).

34. The engine controller of claim 1, further configured to command skipped cylinders of the ICE to operate as an Air Spring (AS).

35. The method of claim 15, further comprising scheduling and implementing the recharge to maintain a pressure within the at least one cylinder sufficiently high to reduce or prevent oil from being sucked into a combustion chamber of the at least one cylinder.

36. The method of claim 15, further comprising scheduling and implementing the reactivation to prepare the at least one cylinder for a fire after one or more skips.

37. The method of claim 15, further comprising commanding skipped cylinders of the ICE to operate as Low Pressure Exhaust Springs (LPES).

38. The method of claim 15, further comprising commanding skipped cylinders of the ICE to operate as High Pressure Exhaust Springs (HPES).

39. The method of claim 15, further comprising commanding skipped cylinders of the ICE to operate as an Air Spring (AS).

40. The engine controller of claim 1, wherein the multiple cylinder events are weighted with respect to one another.

41. The method of claim 15, wherein the two or more cylinder events are weighted with respect to one another.

42. An engine controller configured to control operation of cylinders of a variable displacement internal combustion engine (ICE), the engine controller configured to:
(a) ascertain a firing fraction less than one (1) for a received torque request, the ascertained firing fraction suitable for operating the cylinders of the variable displacement ICE so that sufficient torque is generated to meet the received torque request;
(b) select a firing pattern, among different firing patterns each associated with the ascertained firing fraction that is less than one (1), the selection based on a history of counted cylinder events for the cylinders of the variable displacement ICE;
(c) operate the variable displacement ICE at the ascertained firing fraction using the selected firing pattern;
(d) revise the ascertained firing fraction if a rotational speed of a turbo system associated with the variable displacement ICE falls below a threshold; and
(e) operating the variable displacement ICE at the revised firing fraction and a second firing pattern associated with the revised firing fraction to increase the rotational rate of the turbo system,
wherein the different firing patterns define non-rotating patterns for the cylinders that are different from one another respectively,
the non-rotating patterns differentiated from one another by different groups of cylinders that are continually fired and continually skipped respectively.

* * * * *